United States Patent [19]
Kimura

[11] 4,316,431
[45] Feb. 23, 1982

[54] ARTIFICIAL FISH-GATHERING UNDERWATER REEF

[76] Inventor: Koichi Kimura, 16-6, Mikunihonmachi 2-chome, Yodogawa-ku, Osaka-shi, Osaka-fu, Japan

[21] Appl. No.: 182,496

[22] Filed: Aug. 29, 1980

[51] Int. Cl.³ .......................................... A01K 61/00
[52] U.S. Cl. ...................................................... 119/3
[58] Field of Search ................................... 119/3, 2, 4

[56] References Cited

U.S. PATENT DOCUMENTS

| | | | |
|---|---|---|---|
| 3,898,958 | 8/1975 | Pranis, Jr. | 119/3 |
| 4,165,711 | 8/1979 | Aoki | 119/3 |

FOREIGN PATENT DOCUMENTS 2843391  4/1979  Fed. Rep. of Germany .......... 119/3

*Primary Examiner*—Hugh R. Chamblee
*Attorney, Agent, or Firm*—Jones, Thomas & Askew

[57] ABSTRACT

The invention relates to an artificial fish-gathering reef constructed with square bar materials and plate materials, the plate materials are alternately piled on the bar materials in a manner to provide open rooms for fish-swimming space.

4 Claims, 8 Drawing Figures

ARTIFICIAL FISH-GATHERING UNDERWATER REEF

TECHNICAL FIELD

The present invention relates to an artificial fish-gathering underwater reef and particularly to an artificial fish-gathering reef wherein the plate materials are arranged to be displaced successively by a constant distance so as not to overlap each other.

BACKGROUND OF THE INVENTION

Though new artificial fish-gathering underwater reefs have so far been proposed to better the tidal current, improve the fish-swimming space or form many rooms, there was never proposed a simple structure which permitted the activation of photo synthesis, the attachment of seaweeds and shellfishes and the protection and breeding of the fry.

SUMMARY OF THE INVENTION

The underwater structure of the present invention is constructed in the manner that the square bar materials and the plate materials are alternately piled up to form internally the fish-swimming room spacious enough to let the tidal current pass through and plural small chambers formed between the plate materials for forming small chambers by the adjacent square bar materials are vertically arranged in the manner that said plate materials may not be down-viewingly overlapped and so said plate materials may receive a large quantity of effective solar radiation so that the photo synthesis is activated so much as necessary for the multiplication of vegetable planktons, the seaweeds attached to said plate materials and the shellfishes living on seaweeds are grown well whereby the environment is bettered for the protection and breeding of fishes being fed with shellfishes and particularly the fry.

DETAILED DESCRIPTION OF THE PREFERRED EMBODIMENT

The principal object of the present invention is to propose an underwater reef structure for enlarging the quantity of effective solar rayons to be received by the materials of the fish-gathering underwater reef of terrace type and for enhancing the photo synthesis necessary to multiply seaweeds and vegetable planktons.

Another object of the present invention is to propose a fish-gathering underwater structure in the environment suitable to the protection and growth of seaweeds and the breeding of fishes particularly the fry being fed with seaweeds.

Figure 1:
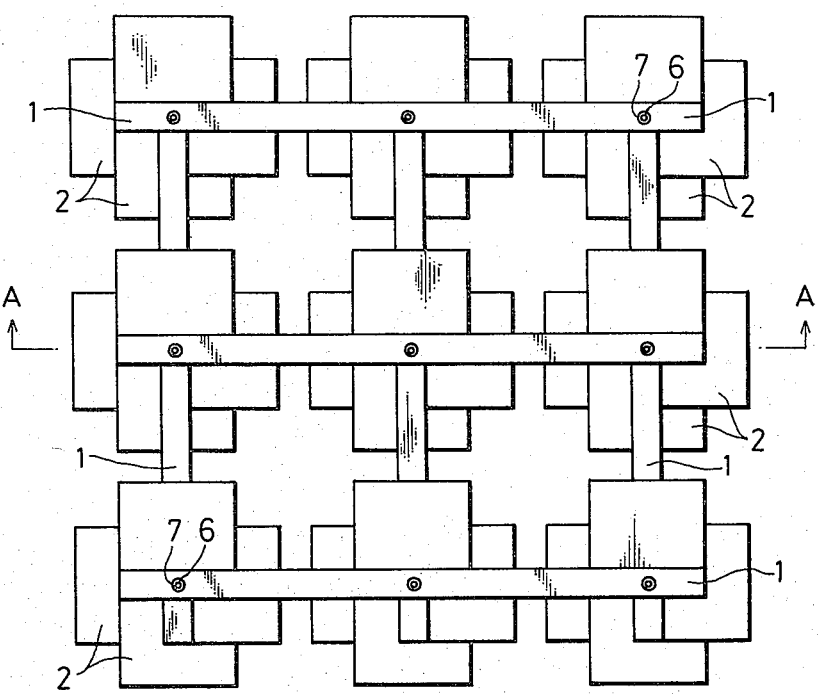
FIG. 1 is plan of the fish-gathering underwater reef of terrace type.

The present invention is described in detail with reference to an example of embodiment illustrated in the drawings. Numeral (1) denotes the transverse connection materials such as square bar materials of square cross-section. Numeral (2) denotes the plate materials of the cross-section such as downviewingly square, polygonal or circular, said plate materials having respective erect wall (4) on the upper or lower surface if desired, and both members (1) and (2) being prepared of concrete or synthetic resin.

The artificial fish-gathering underwater reef of terrace type of the present invention is so constructed that said transverse connection materials (1) and the plate materials (2) are alternately piled multiplicately, and the plate materials (2) are arranged at the positions spaced from each other by a constant interval so as not to overlap downviewingly relative to the lower plate materials (2). Furthermore the connection members (5) such as the structure obtained by connecting fixingly with the tie-bolts passed vertically through members (1) and (2) or, more particularly, by arranging for example a plurality of transverse connection materials (1) algned with a constant interval from each other and plate materials (2) with a constant vertical interval, moreover arranging a plurality of transverse connection materials (1) crossing rectangularly the former transverse connection materials (1) on said plate materials (2), as well as arranging, on said transverse connection materials (1), plate materials (2) shifted downviewingly with a constant interval relative to said lower plate materials (2), after then similarly to all the above mentions, the transverse connection materials (1) and the plate materials (2) are alternately overlaid suitably multiplicately, and simultaneously the tie-bolts (6) being passed through the transverse connection materials (1) and the plate materials (2) of all longitudinal lines from the lowest stage to the top stage, and the fastening members (7) being mounted to the tops of said tie-bolts.

The examples being illustrated with the drawings include a downviewingly square fish-gathering artificial reef having three square bars connecting transversely and aligned in parallel, each transverse connection bar (1) being mounted with three plate materials (nine plates in total), and another downviewingly square fish-gathering artificial reef having two transverse connection materials (1, 1) of square bars arranged in parallel, each transverse connection material being mounted with two plates (2) (four plates in total). However the fish-gathering artificial reef is not limited to have these forms but may have a downviewingly prolonged rectangular form if desired.

Figure 2:
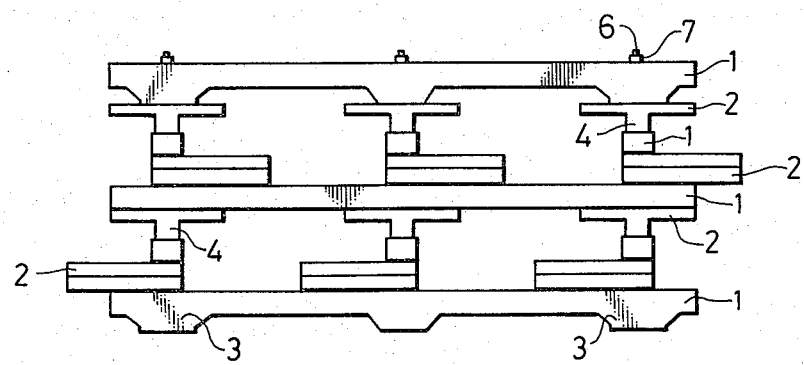
FIG. 2 is the front view thereof.
Figure 3:
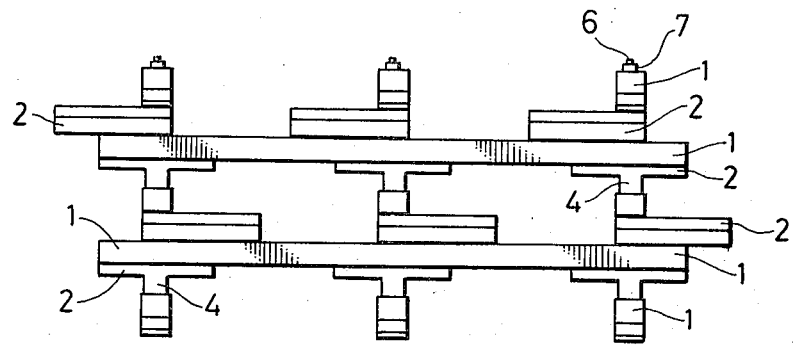
FIG. 3 is the left lateral view thereof.
Figure 4:
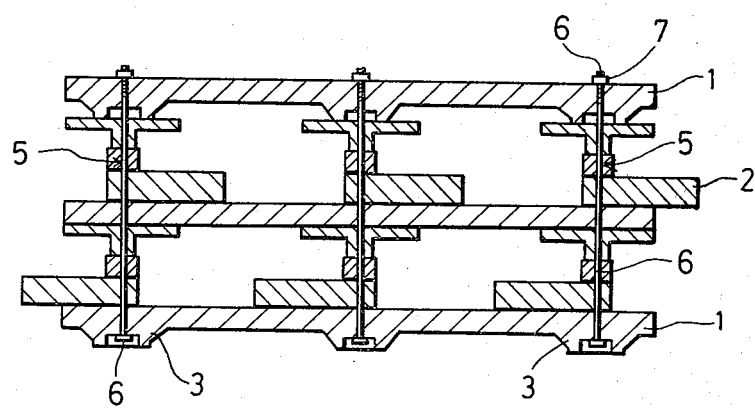
FIG. 4 is the cross-sectional view along Line A—A.

In FIGS. 1-4, the plate material (2) has a downviewingly square form and is mounted incorporately or separately with an erect wall (4) of square bar form in the center of the lower surface, the part mounted with said erect wall (4) being mounted on the transverse connection materials (1) aligned in parallel of the lowest stage, the transverse connection material next to the lowest stage being crossed with the transverse connection material of the lowest stage and mounted on one side of said plate material (2) for example toward the right end in FIG. 2, the part of erect wall (4) of the plate material next to the lowest stage being arranged to be mounted on the transverse connection material of said second stage. In this case, because the relatively upper plate material (2) is disposed not to overlap downviewingly the relatively lower plate material, the present example is so adapted that the plate material is shifted downviewingly counterclockwise (see FIG. 1), while the transverse connection material of the lowest stage is disposed under the left end of said plate material (2) of the second stage in FIG. 3 and the plate material (2) is mounted on the transverse connection material of the second stage.

The artificial fish-gathering reef illustrated as an example of embodiment in FIGS. 1-4 has the transverse connection materials (1) overlaid in five stages, the upper plate materials (2) being overlapped downviewingly by about one quarter of area relative to the lower plate materials (2), thus the artificial reef being formed as if rotated counterclockwise by a constant distance.

Figure 7:
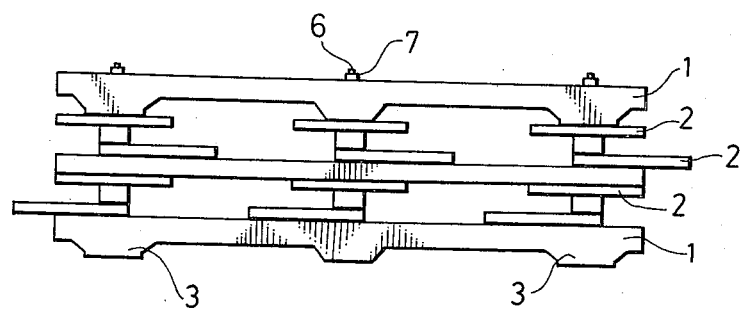
FIG. 7 is the front view of another embodiment for the fish-gathering underwater reef of terrace type.
Figure 8:
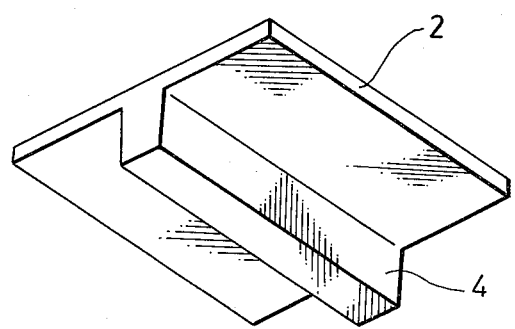
FIG. 8 is a perspective view from below of the plate material.

The artificial fish-gathering reef as illustrated in FIG. 7 has the arrangement of transverse connection materials and plate materials the same with those in FIGS. 1-4, but does not have erect walls (4) on the lower surface of plate materials (2), the upper and lower transverse connection materials being separated narrowly.

Figure 5:
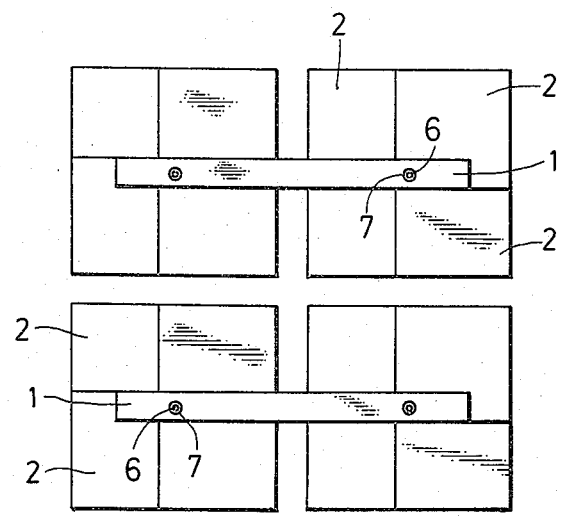
FIG. 5 is plan of another embodiment for the fish-gathering underwater reef of terrace type.
Figure 6:
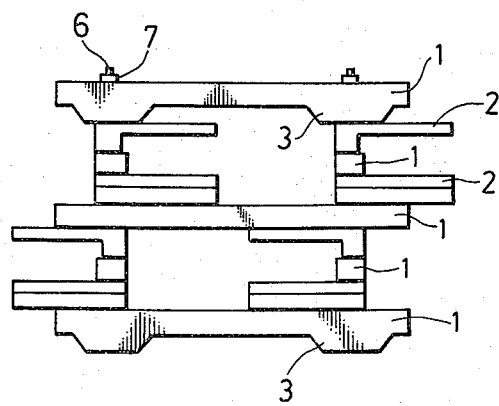
FIG. 6 is the front view thereof.

The artificial fish-gathering reef illustrated in FIGS. 5 and 6 is another example of embodiment for the present invention for presenting a different mode of overlap of the plate materials (2). Though the center part of the plate material of the preceding example of FIGS. 1-4 is placed on the transverse connection materials (1), a lateral side of the plate materials (2) in FIGS. 5 and 6 are placed on the transverse connection materials (1), while the upper plate materials (2) are shifted downviewingly successively clockwise or counter-clockwise.

Though the transverse connection materials (1) may be of the same form and the same dimensions in different stages, the transverse connection materials of the lowest and top stages in the present example are different from those in other stages to have sufficient structural strength because of the thick longitudinal and transverse dimensions, or their lower surfaces are attached with legs (3) and the lower surface of the transverse connection material (1) is rather spaced from the surface of the lower material so that wires of the transverse connection materials (1) of the lowest and top stages for hanging the fish-gathering structure are fastened without fail and are easily removed after the underwater laying of the fish-gathering structure.

As described above, the alternately overlaid transverse connection materials (1) and plate materials (2) are fixingly interlocked by suitable connecting members (5) and, as shown in the example of embodiment, are fastened each other by the aid of the tie-bolts (6) erected with a constant interval from the transverse connection materials (1) of the lowest stage. In other words, said tie-bolts (6) are inserted in the through holes bored at suitable positions of the plate materials (2) and the transverse connection materials (1) have been alternately piled, the fitting members (7) such as nuts or fastening pins are screwed or fitted into the ends of tie-bolts (6) to fasten the construction materials, and the fish-gathering structure is assembled while the tie-bolts have not slipped out of the transverse connection materials and the plate materials. In this case, the fitting members (7) are fastened strongly enough to prevent all materials (1, 2) from loosening or the soft fish-gathering structure is fastened so loosely that both materials (1, 2) particularly plate materials (2) may be rotated by the external force applied to the center of tie-bolt (6).

As described hereinbefore, the artificial underwater reef of terrace type of the present invention is so constructed that the transverse connection materials (1) and the plate materials (2) are alternately piled, while the plate materials (2) are arranged so as not to be overlaid downviewingly, whereby said artificial fish-gathering underwater reef when laid underwater in relatively shallow sea where ample solar beam reaches can receive effective quantity of solar ray, because the plate materials (2) are downviewingly shifted from their regular positions and so the photo synthesis is achieved active so that the seaweeds attached to the plate materials (2) or the planktons swimming around plate materials are multiplied so well and a great deal of shellfishes are attached to live on these seaweeds and vegetable planktons, while animal planktons are multiplied in smaller spaces between plate materials (2) and in larger spaces to prepare the environment suitable for the growth of different fishes particularly the fry.

Since the artificial fish-gathering reef of the present invention proposes an underwater structure having inside an ample fish-gathering space passable through by the tidal current and suitable to serve as fish-farm, said structure containing along vertical direction plural small spaces between the plate materials (2) of different heights, which spaces constitute the shelters effective to accommodate fishes and particularly the fry and to prevent them from the attack of external enemies. In addition to the possible proposal of residential space to fishes which is conceivable as available from the appropriate habit of fishes, the structure around said plate materials (2) is so complicate as generating the tidal vortexes and therefore the tidal drifts for planktons are often formed.

Moreover, the structure of artificial fish-gathering reef according to the present invention is remarkable simple, requiring a smaller number of the articles of parts including the transverse connection materials and plate materials. When these materials (1, 2) are made of concrete, they are prepared easily even on the sea-shore so that the production costs may be inexpensive and, if tie-bolts are available for the assemblage of the fish-gathering artificial reef, only the transverse connection materials and plate materials may be alternately hung up by a crane or the like and piled up, therefore the assemblage of the fish-gathering structure may be achieved very rapidly and simply, moreover the assembling conditions are much stable and the assembly has sufficient strength.

What is claimed is:
1. An artificial fish-gathering reef comprising:
a first plurality of transverse interconnection means aligned in spaced apart relation to each other;
a plurality of plate means defining plate surfaces and connected to each interconnection means at intervals along said interconnection means, so that an open space exists between adjacent plate means;
upstanding means associated with said plate means and extending in vertical spaced relation to said plate surfaces;
a second plurality of transverse interconnection means aligned in spaced apart relation to each other, said second plurality of interconnection means being mounted to said upstanding means and aligned subtantially transverse to said first plurality of interconnection means, so that said first plurality and second plurality of interconnection means are vertically separated from each other; and
a second plurality of plate means defining plate surfaces and mounted to each of said second interconnection means at spaced intervals corresponding to the spacing between said first plurality of interconnection means, so that said second plurality of plate means are vertically aligned to overlay said first plurality of plate means, whereby aligned open spaces are present between adjacent second plate means, and these aligned open spaces are in vertical alignment with said open spaces between the first plate means.

2. Apparatus as in claim 1, wherein:

said first plate surfaces are laterally offset to provide terraces overlaying only a portion of the corresponding second plate surfaces, so that said terraces define relatively protected fish gathering spaces adjacent said vertically aligned open spaces between the plate means.

3. An artificial fish-gathering reef comprising:

a plurality of interconnected reef forming layers, each said layer having a substantially horizontal extent and being vertically spaced apart from the adjacent layer;

each said layer including plural transverse interconnection means aligned in mutually spaced apart relation, and plural plate means disposed in fixed relation to each interconnection means at intervals therealong so that an open space exists between adjacent plate means;

upstanding means associated with each plate means and extending in vertical spaced apart relation to the plate means;

each reef forming layer being separated from adjacent said layers by said upstanding means to form a stack of such layers maintained in mutually spaced apart relation; and each reef forming layer being rotated a certain fixed extent relative to the adjacent layer, as viewed downwardly, so that the plate means of each said layer are vertically overlaid and said open spaces are vertically aligned to admit sunlight through the artificial reef.

4. An artificial reef as in claim 1, wherein:

said plate means of each layer being assymetrically disposed relative to said transverse interconnection means of said layer, so that the plate means of each layer are laterally offset to form terraces which overlay only a portion of the plate means of the rotated vertically spaced-apart adjacent layer, thereby defining relatively protected fish gathering spaces between the terraces of adjacent layers and adjacent said vertically aligned open spaces extending through the reef.

* * * * *